United States Patent
Bhandari et al.

(10) Patent No.: US 12,421,138 B2
(45) Date of Patent: Sep. 23, 2025

(54) SOLVENT ASSISTED CAVITATION FOR WASTE WATER TREATMENT

(71) Applicant: COUNCIL OF SCIENTIFIC AND INDUSTRIAL RESEARCH, New Delhi (IN)

(72) Inventors: Vinay Manoharrao Bhandari, Pune (IN); Pravin B. Patil, Pune (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 529 days.

(21) Appl. No.: 17/782,410

(22) PCT Filed: Dec. 5, 2020

(86) PCT No.: PCT/IN2020/051007
§ 371 (c)(1),
(2) Date: Jun. 3, 2022

(87) PCT Pub. No.: WO2021/111476
PCT Pub. Date: Jun. 10, 2021

(65) Prior Publication Data
US 2023/0020669 A1    Jan. 19, 2023

(30) Foreign Application Priority Data

Dec. 5, 2019   (IN) .............................. 201911050122

(51) Int. Cl.
C02F 1/34   (2023.01)
C02F 1/26   (2023.01)
(Continued)

(52) U.S. Cl.
CPC .................. *C02F 1/34* (2013.01); *C02F 1/26* (2013.01); *C02F 1/36* (2013.01); *C02F 2101/345* (2013.01); *C02F 2101/38* (2013.01)

(58) Field of Classification Search
CPC ...... C02F 1/34; C02F 1/26; C02F 1/46; C02F 1/32
See application file for complete search history.

(56) References Cited

U.S. PATENT DOCUMENTS 9,422,592 B2   8/2016   Morris et al.
9,725,338 B2   8/2017   Ranade et al.

FOREIGN PATENT DOCUMENTS

WO   WO-9920683 A1 *   4/1999   ............. C08G 63/90
WO   WO-0238512 A1 *   5/2002   ............. B01F 5/0268

OTHER PUBLICATIONS

Badmus et al., "Treatment of Persistent Organic Pollutants in Wastwater Using Hydrodynamic Cavitation in Synergy with Advanced Oxidation Process," Environmental Science and Pollution Research, (2017), 16 pages.

(Continued)

*Primary Examiner* — Krishnan S Menon
(74) *Attorney, Agent, or Firm* — CANTOR COLBURN LLP (57) ABSTRACT

The present invention discloses a solvent assisted cavitation process for the removal of pollutants from waste water comprising treating waste water in a batch or continuous process in a cavitation device fed with 1-10% of an immiscible solvent resulting in a reduction in concentration of ammoniacal nitrogen and/or COD in the waste water.

12 Claims, 8 Drawing Sheets

(51) Int. Cl.
*C02F 1/36* (2023.01)
*C02F 101/34* (2006.01)
*C02F 101/38* (2006.01)

(56) References Cited

OTHER PUBLICATIONS

Furniss et al., "Vogel's Textbook of Practical Organic Chemistry Fifth Edition," 2 pages.
Gagol et al., "Wastewater Treatment by Means of Advanced Oxidation Processes Based on Cavitation—A Review," Chemical Engineering Journal, (2018), vol. 338, 599-627.
International Search Report; International Application No. PCT/IN2020/051007; International Filing Date—Dec. 5, 2020; Date of Mailing—Mar. 10, 2021; 2 pages.
Sarvothaman et al. "Treatment of Solvent-Contaminated Water Using Vortex-Based Cavitation: Influence of Operating Pressure Drop, Temperature, Aeration, and Reactor Scale," Industrial & Engineering Chemistry Research, (2018), 1-31.
Suryawanshi et al., "Solvent Degradation Studies Using Hydrodynamic Cavitation," Environmental Progress & Sustainable Energy, (2017), vol. 00, (No. 00), 1-10.
Written Opinion for International Application No. PCT/IN2020/051007; International Filing Date—Dec. 5, 2020; Date of Mailing—Mar. 10, 2021; 6 pages.

* cited by examiner

SOLVENT ASSISTED CAVITATION FOR WASTE WATER TREATMENT

CROSS REFERENCE TO RELATED APPLICATIONS

This application is a National Stage application of PCT/IN2020/051007, filed Dec. 5, 2020, which claims priority to Indian Application No. 201911050122, filed Dec. 5, 2019, the entire contents of which are incorporated herein by reference.

FIELD OF THE INVENTION

The present invention relates to a solvent assisted cavitation for waste water treatment. More particularly, the present invention relates to a solvent assisted cavitation process for the removal of pollutants/ammoniacal nitrogen from waste water. The present invention further relates to a methodology to enhance or alter the rates of degradation of pollutants using solvent assisted cavitation process.

BACKGROUND AND PRIOR ART OF THE INVENTION

Industries such dyes and pigment, distilleries, food and fisheries generate large quantities of waste water which is high in pollutants such as ammoniacal nitrogen and also high on COD.

The existing methods to decrease the levels of these pollutants can be classified as:
1. Biological methods for removal of COD using microorganisms, biological nitrification/denitrification for the removal of ammoniacal nitrogen.
2. Physico-chemical methods including membrane separations, chemical precipitation etc. Extraction processes are not conventionally used for wastewater treatment.
3. Adsorption/ion exchange that requires use of specific adsorbents/resins and can have problems in using, in regeneration, cost of material and efficiency apart from problem of secondary waste generation.
4. Cavitation is a physico-chemical method that works on the principle of in situ generation of oxidizing agents for oxidative destruction of species. It has limited commercial viability due to various process efficiency and economic issues.

The subject of chemical or physico-chemical removal of ammoniacal nitrogen has received little attention barring standard biological methods of treatment as compared to COD removal. Ammoniacal nitrogen is a serious problem in many industrial wastewaters due to limitations of both biological and conventional physico-chemical methods. Ammoniacal nitrogen is a measure of the nitrogenous organic matter as ammonia, a toxic pollutant that can directly poison humans and upset the equilibrium of water systems. The conventional methods attempted include biological, physical, chemical methods or combination of these methods and most of these such as adsorption, chemical precipitation, membrane filtration, reverse osmosis, ion exchange, air stripping, breakpoint chlorination and biological nitrification/denitrification have limitations in removal efficiency as well as in cost of operation. The conventional cavitation process also has limitations in this regard.

U.S. Pat. No. 9,422,592 titled "Vortex diodes as effluent treatment devices" to the inventors of this application disclose a vortex diode apparatus for treating effluent water. Its efficiency in removing colour from the effluents and decreasing COD is reported. The process mainly discusses advantages of using the new cavitating device, vortex diode in hydrodynamic cavitation and its design.

U.S. Pat. No. 9,725,338 titled "Apparatus and method for reduction in ammoniacal nitrogen from waste waters" also to the inventors of this application provides an apparatus that can reduce ammoniacal nitrogen in waste waters. However, the process was not very efficient for removal of ammoniacal nitrogen with only cavitation and higher efficiency could be obtained using process intensification such as aeration in cavitation.

Reference may be made to articles, Suryawanshi et al., *Environ. Prog. Sustain. Energy* 2017, 37, 295-304, https://doi.org/10.1002/ep.12674; Sarvothaman et al., *Ind. Eng. Chem. Res.* 2018, 57, 9292-9304, https://doi.org/10.1021/acs.iecr.8b01688 which disclose hydrodynamic cavitation process for the treatment of waste water, essentially at ambient temperature (~30 C). The usage of solvents for the removal of pollutants in this invention can be considered to be in the form of extraction-cavitation process and hence for the treatment of waste water is unusual, since solvents usage usually results in an increase in the COD of waste water. Thus, in exact contrast to conventional cavitation phenomenon, the inventors have evolved a process for the treatment of waste water to reduce its COD and ammoniacal nitrogen content using an immiscible solvent with a cavitation device.

Further, it is essential to evaluate newer methods that have potential to offer techno-economically feasible option for wastewater treatment in general, and ammoniacal nitrogen reduction, in particular.

OBJECTIVES OF THE INVENTION

Main objective of the present invention is to provide a solvent assisted cavitation process for the removal of pollutants from waste water.

Another objective of the invention is to enhance rates of removal of COD and ammoniacal nitrogen in wastewater treatment Yet another objective of the invention is to alter the rates of removal of pollutants.

SUMMARY OF THE INVENTION

Present invention provides a solvent assisted cavitation process for the removal of pollutants from waste water comprising treating waste water in a batch or continuous process in a cavitation device fed with 1-10% of an immiscible solvent resulting in a reduction in concentration of ammoniacal nitrogen and/or COD in the waste water comprising:
   a) adding waste water and solvent into a storage tank to obtain two phases solution;
   b) pumping the solution as obtained in step (a) into a cavitation device by using pressure drop in cavitation preferably below 2 bar;
   c) allowing the waste water to be treated using the cavitation device for a period ranging between 5 to 180 minutes to obtain the waste water with reduced levels of COD and ammoniacal nitrogen; and
   d) separating the solvent phase from the water phase to obtain the treated water. The process as claimed in claim 1, wherein the solvent used in step (a) is immiscible solvent with water.

In yet another embodiment of the present invention, wherein the solvent used in step (a) is selected from the group consisting of alcohols, ethers, aldehydes, toluene or ketones alone or in combinations thereof.

In yet another embodiment of the present invention, wherein the solvent used in step (a) is an alcohol selected from n-octanol and cyclohexanol alone or in combination thereof.

In yet another embodiment of the present invention, wherein the concentration of the solvent used in step (a) is in the range of 1 to 10% volume per volume of the waste water.

In yet another embodiment of the present invention, wherein said cavitation device in step (b) used for treating the waste water is selected from the group consisting of valves, orifice, venturi and vortex diode.

In yet another embodiment of the present invention, wherein said cavitation process is selected from acoustic cavitation, laser cavitation and particle cavitation.

In yet another embodiment of the present invention, wherein said process is carried out in batch or continuous mode or in combination with waste water treatment methods selected from adsorption, coagulation and oxidation.

In yet another embodiment of the present invention, wherein the COD removal is in the range of 4-12% and the removal of ammoniacal nitrogen is up to 100%.

The present invention provides a cavitation device is selected from, but not limited to valves, orifice, venturi, vortex diode, and cavitation process selected from hydrodynamic cavitation, acoustic cavitation, laser cavitation, particle cavitation.

Abbreviations Used

COD: Chemical Oxygen demand
Amm N: Ammoniacal Nitrogen

DETAILED DESCRIPTION OF THE INVENTION

The invention will now be described in detail in connection with certain preferred and optional embodiments, so that various aspects thereof may be more fully understood and appreciated.

Definitions Used

Waste water is defined as industrial waste water as per the standard pollution norms for organic pollutants and ammoniacal nitrogen as defined by the regulations of individual countries or wastewater containing COD above 250 ppm and/or ammoniacal nitrogen>30 ppm, The terms waste water and effluents are used synonymously and inter changeably in this document.

The terms ammoniacal nitrogen and COD are used synonymously with pollutants/organic pollutants in this document.

Accordingly, the present invention provides a solvent assisted cavitation process for the removal of pollutants from waste water comprising treating waste water in a batch or continuous process in a cavitation device fed with 1-10% of an immiscible solvent resulting in a reduction in concentration of ammoniacal nitrogen and/or COD in the waste water.

The present invention provides a cavitation device is selected from, but not limited to valves, orifice, venturi, vortex diode, and cavitation process selected from hydrodynamic cavitation, acoustic cavitation, laser cavitation, particle cavitation.

In an embodiment, the present invention provides a solvent assisted cavitation process for the removal of pollutants from waste water comprising treating waste water in a batch or continuous process in a cavitation device fed with 1-10% of an immiscible solvent resulting in a reduction in concentration of ammoniacal nitrogen and/or COD in the waste water.

In preferred embodiment, the present invention provides a process for the treatment of waste water comprising:
(a) forming two phases by the addition of waste water and solvent in a tank and pumping into a cavitation device by using pressure drop preferably below 2 bar in cavitation and essentially close to ambient temperature preferably up to 40° C.;
(b) allowing the waste water to be treated using the cavitation device for a short time preferably from 5 to 180 minutes to obtain the waste water with reduced levels of COD and ammoniacal nitrogen and
(c) separating the solvent phase (organic phase) from the water phase to afford treated water with COD and ammoniacal nitrogen removal.

The solvent phase of step (d) can be reused.

The solvent of step (a) is an immiscible solvent with water.

The immiscible solvent is selected from polar, semi-polar, non-polar solvent alone or mixture thereof.

The solvent is selected from alcohols, ethers, aldehydes, ketones and toluene, alone or in combinations thereof.

In a preferred embodiment, the is selected from n-octanol, cyclohexanol alone or in combination thereof.

The solvents are preferably in the range of 1 to 10% volume per volume of the waste water.

In another embodiment, the present invention provides the cavitation device is selected from, but not limited to valves, orifice, venturi, vortex diode, and cavitation process selected from hydrodynamic cavitation, acoustic cavitation, laser cavitation, particle cavitation.

The process is carried out in batch or continuous mode or in combination with other wastewater treatment methods like adsorption, coagulation and oxidation.

In an embodiment, the present invention provides a solvent assisted treatment process for waste water, wherein the removal of COD is in the range of 4-12%.

In another embodiment, the present invention provides a solvent assisted treatment process for waste water, wherein the removal of ammoniacal nitrogen is >90%.

In a preferred embodiment, the present invention provides a solvent assisted treatment process for waste water, wherein the removal of ammoniacal nitrogen is up to 100%.

Figure 3:
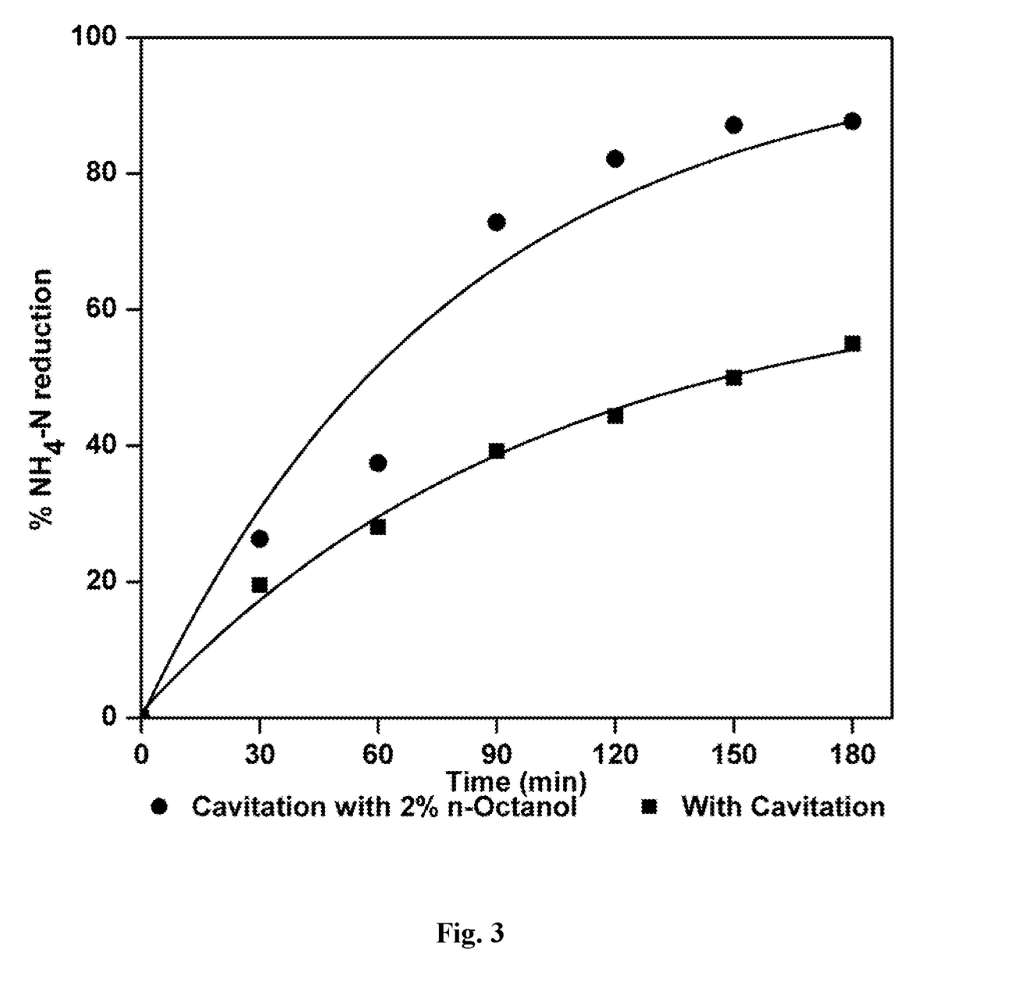
FIG. 3 represents enhancement in the removal of ammoniacal nitrogen using 2% n-octanol over conventional hydrodynamic cavitation (vortex diode; $\Delta p=0.5$ kg/cm$^2$).
Figure 4:
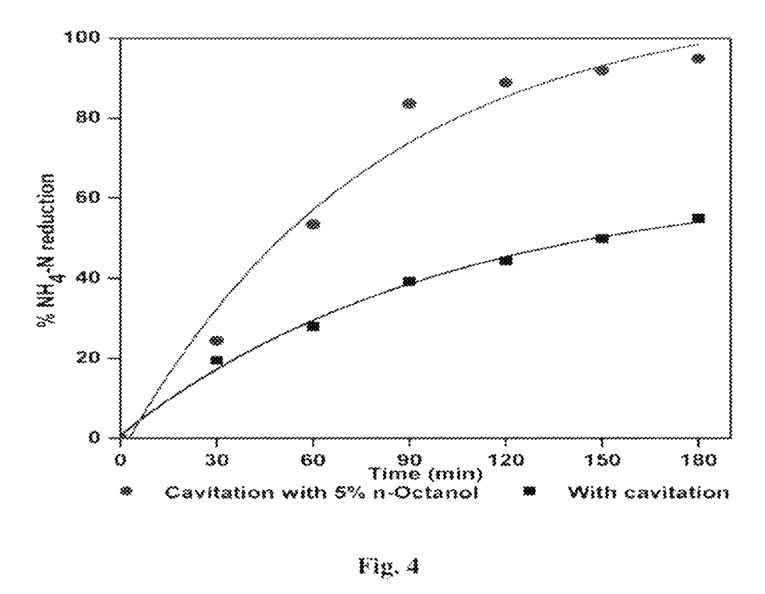
FIG. 4 represents enhancement in the removal of ammoniacal nitrogen using 5% n-octanol over conventional hydrodynamic cavitation (vortex diode; $\Delta p=0.5$ kg/cm$^2$).
Figure 5:
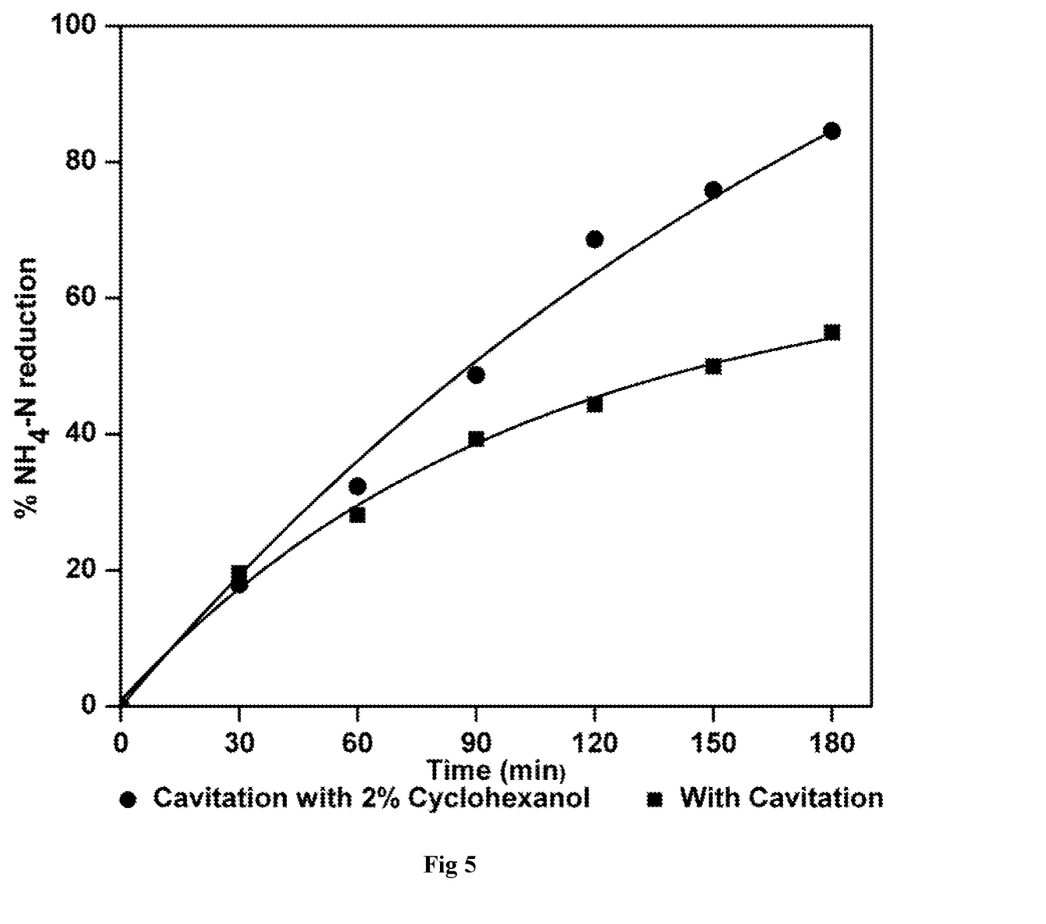
FIG. 5 represents enhancement in the removal of ammoniacal nitrogen using 2% cyclohexanol over conventional hydrodynamic cavitation (vortex diode; $\Delta p=0.5$ kg/cm$^2$).
Figure 6:
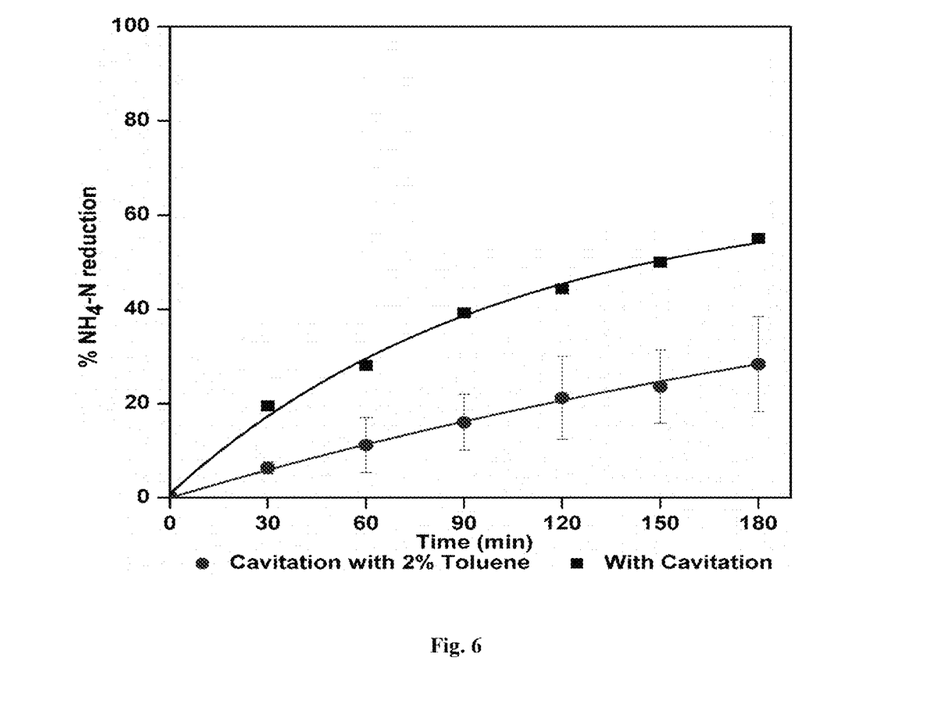
FIG. 6 represents altered reduction in ammoniacal nitrogen using 2% toluene over conventional hydrodynamic cavitation (vortex diode; $\Delta p=0.5$ kg/cm$^2$)

Referring to FIGS. 3 and 4, the effect of solvent assisted treatment of waste water in a cavitation device-vortex diode resulted in a substantial decrease observed in the ammoniacal nitrogen concentrations. FIG. 3 refers to treatment with 2% and FIG. 4 refers to treatment with 5% n-octanol. In zero to 180 minutes the amount of ammoniacal nitrogen removed ranged from 0 to 88% and COD from 0 to ~10% for 2 and 5% octanol respectively, for pressure drop of 0.5 bar. In a comparative embodiment, the cavitation device alone without octanol removed from 0 to about 55% ammoniacal nitrogen in 0-180 minutes. Referring to FIG. 5, treatment of waste water with 2% cyclohexanol resulted in 85% removal of ammoniacal nitrogen in 180 minutes in the cavitation device-vortex diode and using pressure drop of 0.5 bar. FIG. 6 refers to treatment using 2% toluene, a non-polar solvent in the cavitation device. The treatment with toluene resulted in the removal of an altered but lowered reduction in ammoniacal nitrogen compared to only cavitation or compared to solvents such as octanol or cyclohexanol and mere around 25% of the ammoniacal nitrogen.

Figure 7:
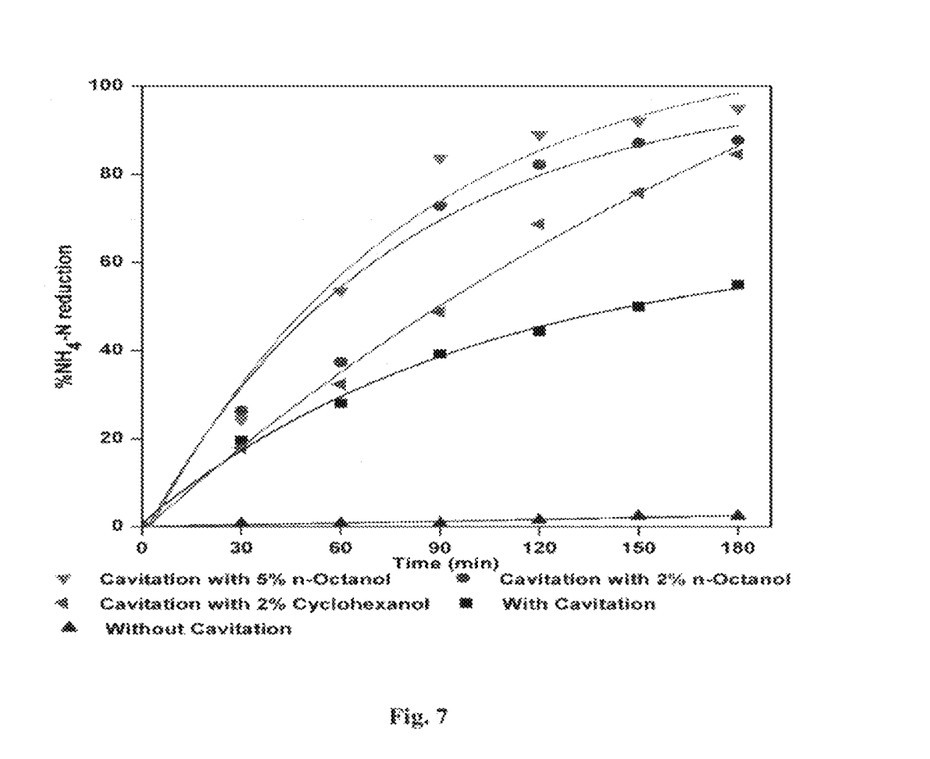
FIG. 7 represents comparison of enhancement in the removal of ammoniacal nitrogen for different solvents over conventional hydrodynamic cavitation (vortex diode; $\Delta p=0.5$ kg/cm$^2$).

In two comparative embodiments, the inventors attempted to remove ammoniacal nitrogen without the cavitation device, by simple extraction process by shaking organic and waste water phases, where no appreciable removal was observed (2.5%), refer FIG. 7.

Figure 8:
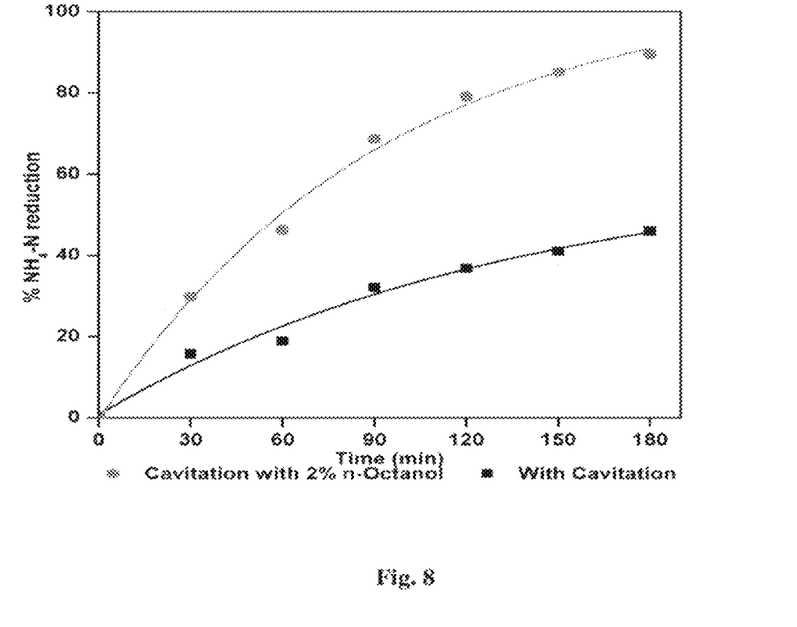
FIG. 8 represents enhancement in the removal of ammoniacal nitrogen by changing reactor geometry using 2% n-octanol over conventional hydrodynamic cavitation (Orifice; $\Delta p=2.0$ kg/cm$^2$).

In FIG. 8, further evidence is provided using another type of cavitation device employing linear flow for cavitation-using orifice. Approximately 90% removal in ammoniacal nitrogen was observed in 180 minutes for 2% n-octanol and pressure drop of 2 bar.

Figure 1:
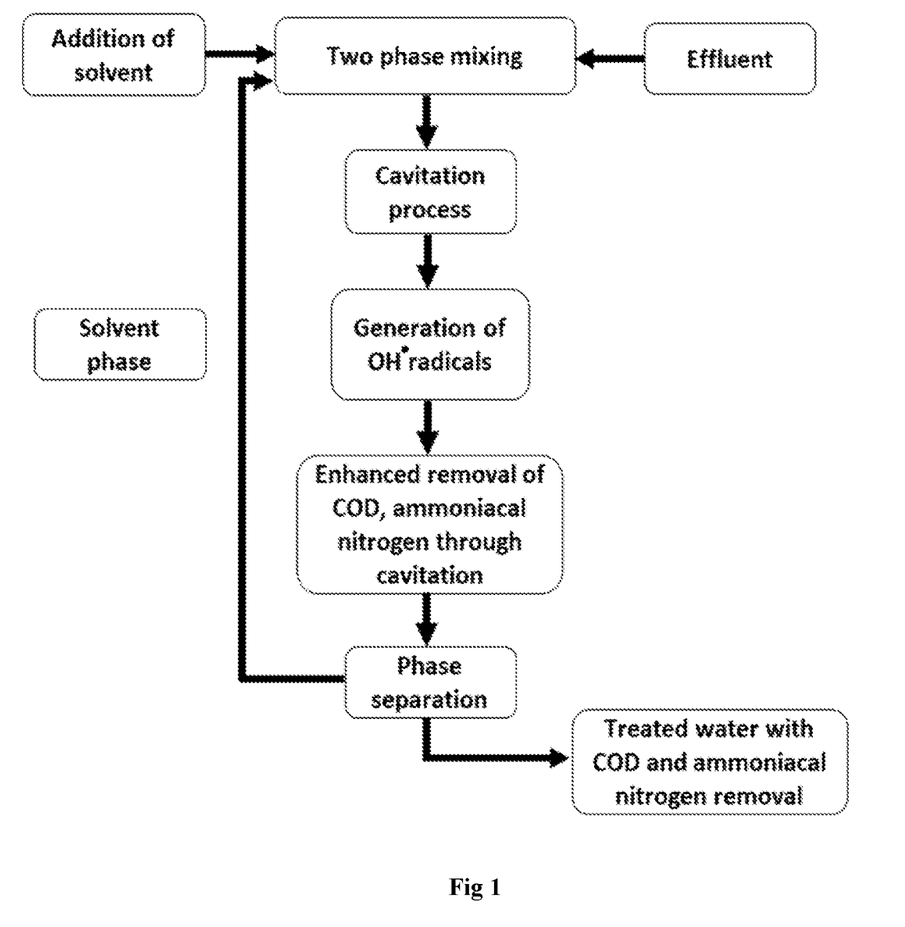
FIG. 1 represents flow chart for enhanced or altered removal of COD/ammoniacal nitrogen from wastewater by use of solvent and using cavitation.
Figure 2:
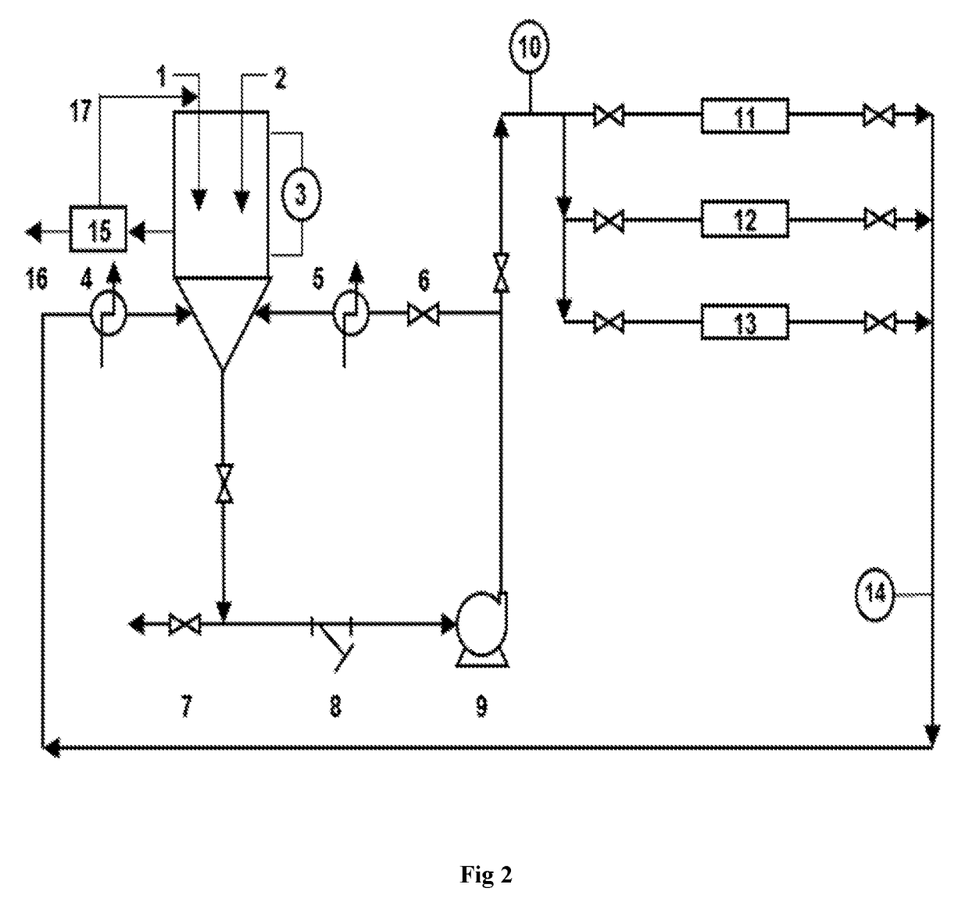
FIG. 2 represents schematic of experimental set-up for solvent assisted hydrodynamic cavitation using different cavitation devices.

In an aspect of the invention, the apparatus for the treatment is provided, Referring to FIG. 2, the apparatus comprises an inlet for solvent (1), an inlet for waste water (2), a level indicator (3), heat exchangers (4 and 5), a bypass valve (6), a sampling point or port (7), a strainer (8), a feed pump (9), pressure transmitters (10 and 14) and the cavitation device selected from orifice, venturi or vortex diode (11, 12 or 13), phase separation (15), treated water (16) and recycled solvent (17). The solvent phase is mixed with the wastewater aqueous phase at an appropriate proportion and sent to cavitation device using the high pressure pump at an appropriate flow rate/pressure drop for cavitation to take place and the output of the cavitation device, partially treated wastewater is sent back to the tank and the process is repeated till the desired degradation or reduction in pollutant concentration is achieved. After the treatment, the solvent phase is separated from the aqueous phase and can be recycled back to the treatment stage. The process can be operated batch wise or continuous with appropriate engineering modifications.

EXAMPLES

Following examples are given by way of illustration therefore should not be construed to limit the scope of the invention.

Example 1

Solvent assisted hydrodynamic cavitation for removal of COD and ammoniacal nitrogen from wastewater using n-Octanol (2%)

Experimental loop for removal of COD/ammoniacal nitrogen from water with disclosed invention was established. The nominal pipe diameter used was ¾". The set up was equipped with pump capable of providing 1500 LPH flow through the section. The storage tank of 50 liter capacity was used for storage of contaminated water to be treated. A vortex diode of 1 $m^3/h$ capacity was used as cavitating device. A synthetic wastewater containing para aminophenol was used as model system for removal of COD and ammoniacal nitrogen. n-Octanol, 2% v/v was used as solvent phase for the treatment. Using solvent assisted process through the disclosed device (vortex diode), ammoniacal nitrogen removal of ~88% was obtained for initial concentration of 100 ppm in about 3 h using pressure drop of 0.5 $kg/cm^2$, an enhancement of ~33% over cavitation alone under similar conditions. The enhancement in reduction over the existing hydrodynamic cavitation under similar operating conditions is compared in FIG. 3.

TABLE 1

Hydrodynamic Cavitation using n-octanol (2%) ($\Delta p = 0.5$ $kg/cm^2$)

| Time (min) | COD removal, % | Ammoniacal nitrogen removal, % | % Enhancement in removal of Amm. N compared to cavitation alone |
|---|---|---|---|
| 0 | 0 | 0 | 0 |
| 30 | 4 | 26 | 7 |
| 60 | 5 | 37 | 9 |
| 90 | 5 | 73 | 34 |
| 120 | 8 | 82 | 38 |
| 150 | 9 | 87 | 37 |
| 180 | 9 | 88 | 33 |

Example 2

Solvent Assisted Hydrodynamic Cavitation for Removal of COD and Ammoniacal Nitrogen from Wastewater Using n-Octanol (5%)

Experimental loop for removal of COD/ammoniacal nitrogen from water with disclosed invention was established. The nominal pipe diameter used was ¾". The set up was equipped with pump capable of providing 1500 LPH flow through the section. The storage tank of 50 liter capacity was used for storage of contaminated water to be treated. A vortex diode of 1 $m^3/h$ capacity was used as cavitating device. A synthetic wastewater containing para aminophenol was used as model system for removal of COD and ammoniacal nitrogen. n-Octanol, 5% v/v was used as solvent phase for the treatment. Using different conditions for the pressure drop through the disclosed device (vortex diode), ammoniacal nitrogen removal of <90% was obtained for initial concentration of 100 ppm in about 3 h using pressure drop of 0.5 $kg/cm^2$. Compared to 2% n-Octanol there was significant removal obtained after 90 min with use of 5% n-Octanol. An enhancement of ~45% in the removal was obtained over that compared to cavitation alone under similar conditions and ~12% improvement over that using 2% n-octanol. The enhancement in reduction over the existing hydrodynamic cavitation under similar operating conditions is compared in FIG. 4. Close to 100% removal in ammoniacal nitrogen can be obtained in 120-150 minutes.

TABLE 2

Hydrodynamic Cavitation using n-octanol (5%) ($\Delta p = 0.5$ kg/cm$^2$)

| Time (min) | COD removal, % | Ammoniacal nitrogen removal, % | % Enhancement in removal of Amm. N compared to cavitation alone |
| --- | --- | --- | --- |
| 0 | 0 | 0 | 0 |
| 30 | 2 | 24 | 5 |
| 60 | 4 | 53 | 25 |
| 90 | 6 | 84 | 45 |
| 120 | 7 | >90 | 46 |

Example 3

Solvent Assisted Hydrodynamic Cavitation for Removal of COD and Ammoniacal Nitrogen from Wastewater Using Cyclohexanol (2%)

Experimental loop for removal of COD/ammoniacal nitrogen from water with disclosed invention was established. The nominal pipe diameter used was ¾". The set up was equipped with pump capable of providing 1500 LPH flow through the section. The storage tank of 50 liter capacity was used for storage of contaminated water to be treated. A vortex diode of 1 m$^3$/h capacity was used as cavitating device. A synthetic wastewater containing paraaminophenol was used as model system for removal of COD and ammoniacal nitrogen. Cyclohexanol, 2% v/v was used as solvent phase for the treatment. Using different conditions for the pressure drop through the disclosed device (vortex diode), ammoniacal nitrogen removal of ~84% was obtained for initial concentration of 100 ppm in about 3 h using pressure drop of 0.5 kg/cm$^2$. An enhancement of ~30% was obtained in the removal over that using conventional cavitation under similar conditions. The enhancement in reduction over the existing hydrodynamic cavitation under similar operating conditions is compared in FIG.

TABLE 3

Hydrodynamic Cavitation using cyclohexanol (2%) ($\Delta p = 0.5$ kg/cm$^2$)

| Time (min) | COD removal, % | Ammoniacal nitrogen removal, % | % Enhancement in removal of Amm. N compared to cavitation alone |
| --- | --- | --- | --- |
| 0 | 0 | 0 | 0 |
| 30 | 3 | 18 | 0 |
| 60 | 5 | 32 | 4 |
| 90 | 7 | 49 | 10 |
| 120 | 8 | 69 | 25 |
| 150 | 10 | 76 | 26 |
| 180 | 11 | 85 | 30 |

Example 4

Altered Rates for Removal of COD and Ammoniacal Nitrogen Using Toluene (2%)

Experimental loop for removal of COD/ammoniacal nitrogen from water with disclosed invention was established. The nominal pipe diameter used was ¾". The set up was equipped with pump capable of providing 1500 LPH flow through the section. The storage tank of 50 litre capacity was used for storage of contaminated water to be treated. A vortex diode of 1 m$^3$/h capacity was used as cavitating device. A synthetic wastewater containing para aminophenol was used as model system for removal of COD and ammoniacal nitrogen. Toluene, 2% v/v was used as solvent phase for the treatment. Using different conditions for the pressure drop through the disclosed device (vortex diode), ammoniacal nitrogen removal of ~28% was obtained for initial concentration of 100 ppm in about 3 h using pressure drop of 0.5 kg/cm$^2$. The rate of reduction in ammoniacal nitrogen gets altered, reduced in this case, by use of 2% toluene compared to conventional cavitation under similar conditions. Use of toluene as solvent has shown altered and comparatively low removal for ammoniacal nitrogen in 3 h (FIG. 6).

TABLE 4

Hydrodynamic Cavitation using toluene (2%) ($\Delta p = 0.5$ kg/cm$^2$)

| Time (min) | COD removal, % | Ammoniacal nitrogen removal, % |
| --- | --- | --- |
| 0 | 0 | 0 |
| 30 | 4 | 6 |
| 60 | 6 | 11 |
| 90 | 7 | 16 |
| 120 | 7 | 21 |
| 150 | 7 | 24 |
| 180 | 9 | 28 |

Example 5

Solvent assisted hydrodynamic cavitation for removal of COD and ammoniacal nitrogen from wastewater using n-Octanol (2%) and orifice as a cavitating device Experimental loop for removal of COD/ammoniacal nitrogen from water with disclosed invention was established. The nominal pipe diameter used was ¾". The set up was equipped with pump capable of providing 1500 LPH flow through the section. The storage tank of 50 liter capacity was used for storage of contaminated water to be treated. Orifice of 3 mm circular hole diameter was used as a cavitating device. A synthetic wastewater containing para aminophenol was used as model system for removal of COD and ammoniacal nitrogen. n-Octanol, 2% v/v was used as solvent phase for the treatment. Using solvent assisted process through the disclosed device (orifice), ammoniacal nitrogen removal of ~90% was obtained for initial concentration of 100 ppm in about 3 h using pressure drop of 2.0 kg/cm$^2$, an enhancement of ~45% over cavitation alone under similar conditions. The enhancement in the reduction of ammoniacal nitrogen was similar to that obtained using the cavitating device-vortex diode, however at higher pressure drop. The enhancement in reduction over the existing hydrodynamic cavitation under similar operating conditions is compared in FIG. 8.

TABLE 5

Hydrodynamic Cavitation using orifice and n-octanol (2%) ($\Delta p = 2.0$ kg/cm$^2$)

| Sr. No | Time (min) | % COD reduction | Ammoniacal nitrogen reduction, % | % Enhancement for Amm. N reduction |
|---|---|---|---|---|
| 1 | 0 | 0 | 0 | 0 |
| 2 | 30 | 2.7 | 29.9 | 15 |
| 3 | 60 | 4.5 | 46.3 | 27 |
| 4 | 90 | 7.4 | 68.7 | 37 |
| 5 | 120 | 10.8 | 79.1 | 42 |
| 6 | 150 | 11.8 | 85.1 | 44 |
| 7 | 180 | 12.2 | 89.6 | 44 |

Advantages of the Invention

Rate and extent of pollutant removal is enhanced
Process is carried out at near ambient conditions
Process possesses economic advantages

We claim:

1. A solvent assisted cavitation process for the treatment of one or more effluents comprising:
   a) adding the one or more effluents and solvent into a storage tank to obtain a two phase solution, including a solvent phase and a one or more effluents phase;
   b) pumping the solution as obtained in step (a) into a cavitation device by using pressure drop in cavitation below 2 bar;
   c) allowing the one or more effluents to be treated using the cavitation device for a period ranging between 5 to 180 minutes to obtain the one or more effluents with reduced levels of COD and ammoniacal nitrogen; and
   d) separating the solvent phase from the one or more effluents phase to obtain treated water.

2. The process as claimed in claim 1, wherein the solvent used in step (a) is selected from the group consisting of alcohols, ethers, aldehydes, toluene or ketones alone or in combinations thereof.

3. The process as claimed in claim 1, wherein the solvent used in step (a) is an alcohol selected from n-octanol and cyclohexanol alone or in combination thereof.

4. The process as claimed in claim 1, wherein the concentration of the solvent used in step (a) is in the range of 1 to 10% volume per volume of the one or more effluents.

5. The process as claimed in claim 1, wherein said cavitation device in step (b) used for treating the one or more effluents is selected from the group consisting of valves, orifice, venturi, or vortex diode.

6. The process as claimed in claim 1, wherein said cavitation process is selected from acoustic cavitation, laser cavitation, hydrodynamic, or particle cavitation.

7. The process as claimed in claim 1, wherein said process is carried out in batch or continuous mode or in combination with treatment of the one or more effluents selected from adsorption, coagulation, or oxidation.

8. The process as claimed in claim 1, wherein the COD removal is in the range of 4-12% and the removal of ammoniacal nitrogen is up to 100%.

9. The process as claimed in claim 1, wherein the solvent used in step (a) is immiscible solvent with the one or more effluents.

10. The process as claimed in claim 1, wherein:
    said process is carried out in batch or continuous mode;
    the concentration of the solvent used in step (a) is in the range of 1 to 10% volume per volume of the one or more effluents; and
    the solvent used in step (a) is immiscible solvent with the one or more effluents.

11. The process as claimed in claim 1, wherein:
    said cavitation process is hydrodynamic cavitation;
    said cavitation device in step (b) used for treating the one or more effluents includes an orifice; and
    the solvent used in step (a) is an alcohol that is n-octanol.

12. The process as claimed in claim 11, wherein the solvent used in step (a) is the alcohol that is the n-octanol at 2%.

\* \* \* \* \*